United States Patent
Sun et al.

(10) Patent No.: US 11,225,617 B1
(45) Date of Patent: Jan. 18, 2022

(54) CONTINUOUS CATALYTIC DEASPHALTING PROCESS

(71) Applicant: Saudi Arabian Oil Company, Dhahran (SA)

(72) Inventors: Miao Sun, Dhahran (SA); Qi Xu, Dhahran (SA); Zhonglin Zhang, Dhahran (SA); Sohel K. Shaikh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 56 days.

(21) Appl. No.: 16/911,800

(22) Filed: Jun. 25, 2020

(51) Int. Cl.
| | |
|---|---|
| *C10G 53/10* | (2006.01) |
| *B01J 19/24* | (2006.01) |
| *B01J 27/19* | (2006.01) |
| *B01J 27/188* | (2006.01) |
| *B01J 23/30* | (2006.01) |
| *B01J 23/28* | (2006.01) |
| *B01J 19/00* | (2006.01) |

(52) U.S. Cl.
CPC .......... *C10G 53/10* (2013.01); *B01J 19/0006* (2013.01); *B01J 19/2445* (2013.01); *B01J 23/28* (2013.01); *B01J 23/30* (2013.01); *B01J 27/188* (2013.01); *B01J 27/19* (2013.01); *B01J 2219/00033* (2013.01); *B01J 2219/00038* (2013.01); *C10G 2300/206* (2013.01)

(58) Field of Classification Search
CPC .............. C10G 53/10; C10G 2300/206; B01J 19/0006; B01J 19/2445; B01J 23/28; B01J 23/30; B01J 27/188; B01J 27/19; B01J 2219/00033; B01J 2219/00038
See application file for complete search history.

(56) References Cited

U.S. PATENT DOCUMENTS

| | | | |
|---|---|---|---|
| 2,101,308 A | 12/1937 | Bray et al. | |
| 2,337,448 A | 12/1943 | Carr | |

(Continued)

FOREIGN PATENT DOCUMENTS

KR 20140121320 A 10/2014

OTHER PUBLICATIONS

Ashtari et al., "Asphaltene removal from crude oil by means of ceramic membranes", Journal of Petroleum Science and Engineering, vol. 82-83, pp. 44-49, 2012.

(Continued)

*Primary Examiner* — Brian A McCaig
(74) *Attorney, Agent, or Firm* — Dinsmore & Shohl LLP

(57) ABSTRACT

In accordance with one or more embodiments of the present disclosure, a continuous catalytic deasphalting process includes introducing a feed comprising crude oil and solvent to a first reactor to deasphalt the feed, producing polymerized asphaltene adsorbed to the catalyst and deasphalted oil; introducing solvent to a second reactor to regenerate catalyst in the second reactor while the deasphalting step is performed in the first reactor; introducing a wash solvent to the first reactor after deasphalting to remove the polymerized asphaltene, thereby regenerating the catalyst in the first reactor and producing a mixture comprising solvent and polymerized asphaltene; passing the mixture to a separator downstream of the reactor system to separate the wash solvent from the polymerized asphaltenes; and reintroducing at least a portion of the separated wash solvent to at least one of the first and second reactors.

15 Claims, 3 Drawing Sheets

(56) References Cited

U.S. PATENT DOCUMENTS

| | | |
|---|---|---|
| 2,367,671 A | 1/1945 | Dickinson et al. |
| 2,850,431 A | 9/1958 | Smith |
| 2,940,920 A | 6/1960 | Garwin |
| 3,159,571 A | 12/1964 | Reman et al. |
| 3,180,820 A | 4/1965 | Gleim et al. |
| 3,240,718 A | 3/1966 | Gatsis |
| 3,249,530 A | 5/1966 | Gatsis |
| 3,249,556 A | 5/1966 | Gatsis |
| 3,252,894 A | 5/1966 | Gatsis |
| 3,293,172 A | 12/1966 | Gleim |
| 3,331,769 A | 7/1967 | Gatsis |
| 3,364,138 A | 1/1968 | Campagne et al. |
| 3,420,771 A | 1/1969 | O'Hara |
| 3,813,329 A | 5/1974 | Gatsis |
| 3,825,488 A | 7/1974 | Gatsis |
| 4,101,415 A | 7/1978 | Crowley |
| 4,290,880 A | 9/1981 | Leonard |
| 4,548,711 A | 10/1985 | Coombs et al. |
| 5,171,727 A | 12/1992 | Gatsis |
| 5,288,681 A | 2/1994 | Gatsis |
| 5,474,977 A | 12/1995 | Gatsis |
| 9,464,239 B2 | 10/2016 | Nares Ochoa et al. |
| 2006/0260927 A1 | 11/2006 | Abazajian |
| 2013/0264247 A1 | 10/2013 | Cardenas et al. |
| 2014/0001089 A1 | 1/2014 | Bazer-Bachi et al. |
| 2015/0065765 A1 | 3/2015 | Villechange et al. |
| 2015/0321975 A1 | 11/2015 | Choi et al. |
| 2017/0107433 A1 | 4/2017 | Choi et al. |
| 2020/0102507 A1 | 4/2020 | Sun et al. |

OTHER PUBLICATIONS

Eom et al., "Hydrocracking of extra-heavy oil using Cs-exchanged phosphotungstic acid (CsxH3-xPW12O40.x=1-3) catalysts". Fuel, vol. 126, pp. 263-270, 2014.

Karimi et al., "Quantitative Evidence for Bridged Structures in Asphaltenes by Thin Film Pyrolysis", Energy & Fuels, vol. 25, pp. 3581-3589, 2011.

Liao et al., "Discussion on the Structural Features of Asphaltene Molecules", Energy Fuels, vol. 23, pp. 6272-6274, 2009.

Payzant et al., "Structural Units of Athabasca Asphaltene: The Aromatics with a Linear Carbon Framework", Energy & Fuels, vol. 5, pp. 445-453, 1991.

Pelet et al., "Resins and asphaltenes in the generation and migration of petroleum", Org. Geochem, Fol. 10, pp. 481-498, 1986.

Search Report for International Application No. PCT/US2018/047240 dated Oct. 23, 2018, 12 pgs.

International Search Report and Written Opinion dated Mar. 16, 2021 pertaining to International application No. PCT/US2020/052148 filed Sep. 23, 2020, 13 pgs.

CONTINUOUS CATALYTIC DEASPHALTING PROCESS

TECHNICAL FIELD

Embodiments of the present disclosure generally relate to deasphalting a crude oil stream, and pertains particularly to a continuous catalytic deasphalting process for producing a reduced concentration of asphaltenes in deasphalted oil.

BACKGROUND

Asphaltenes are the heaviest and most polar compounds naturally occurring in crude oil, which typically includes asphaltenes in concentrations ranging from 1% by weight to 17% by weight, and they are also identified as a major factor in causing difficulties during crude oil transportation and refining. Asphaltenes are one of the four main substances believed to be soluble in crude oils at atmospheric pressure and ambient temperature, the others being saturates, aromatics, and resins. However, unlike resins, asphaltenes contain highly polar species that tend to associate, and as a result, the interactions of asphaltenes with the environment are very complex.

Asphaltenes are a mixture of high molecular weight polycyclic aromatic hydrocarbons and heterocyclic compounds, primarily comprising carbon, hydrogen, nitrogen, oxygen, and sulfur, as well as trace amounts of vanadium and nickel. In asphaltenes, the hydrogen-to-carbon ratio is approximately 1.2:1. Asphaltenes are defined operationally as n-heptane-insoluble, toluene-soluble component of a carbonaceous material such as crude oil, and are sticky, black, highly viscous residue of distillation processes.

All aspects of crude oil production and refining may be negatively impacted by asphaltenes. For example, asphaltenes precipitation or deposition can occur in wellbores, pipelines, and surface facilities, limiting well productivity and fluid flow. Further, asphaltenes may clog the refining system, causing damage and lost productivity for oil refiners.

Conventional asphaltenes separation, which may utilize Solvent De-asphalting (SDA) technology, involves applying paraffinic solvents (n-propane, n-butane, n-pentane, n-hexane, or n-heptane) to perform liquid-liquid extraction, to produce higher-value De-Asphalted Oil (DAO). However, the SDA process requires a considerable amount of expensive paraffinic solvents (the solvent to crude oil ratio is typically from 2:1 to 10:1 by volume). Furthermore, the separation and recovery of paraffinic solvents from DAO are energy-intensive processes.

Other methods of asphaltenes separation include passing an oil feed containing asphaltenes through a de-asphalting column containing a catalyst for polymerizing the asphaltenes. However, the catalyst deactivates over time, causing downtime where the de-asphalting column is offline.

SUMMARY

There is a continual need for novel processes for producing DAO. Embodiments of the present disclosure are directed to a continuous catalytic deasphalting process focused on addressing this need.

According to one embodiment, a continuous catalytic deasphalting process for producing a reduced concentration of asphaltenes in deasphalted oil includes a catalytic deasphalting reactor system, the catalytic deasphalting reactor system comprising at least a first catalytic deasphalting reactor and a second catalytic deasphalting reactor arranged in parallel, wherein the first catalytic deasphalting reactor and the second catalytic deasphalting reactor each comprise catalyst having a solid heteropolyacid compound. The process includes introducing a feed comprising crude oil and non-paraffinic solvent to the first catalytic deasphalting reactor to deasphalt the feed, wherein the deasphalting produces polymerized asphaltene adsorbed to the catalyst and deasphalted oil; introducing non-paraffinic solvent to the second catalytic deasphalting reactor to regenerate catalyst in the second catalytic deasphalting reactor while the deasphalting step is performed in the first catalytic deasphalting reactor; introducing a non-paraffinic wash solvent to the first catalytic deasphalting reactor after deasphalting to remove the polymerized asphaltene, thereby regenerating the catalyst in the first catalytic deasphalting reactor and producing a mixture comprising solvent and polymerized asphaltene; passing the mixture to a separator downstream of the catalytic deasphalting reactor system to separate the wash solvent from the polymerized asphaltenes; and reintroducing at least a portion of the separated wash solvent to at least one of the first and second catalytic deasphalting reactors of the catalytic deasphalting reactor system.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

In one or more embodiments, a continuous catalytic deasphalting process for producing a reduced concentration of asphaltenes in deasphalted oil uses a catalytic deasphalting reactor system having at least a first catalytic deasphalting reactor and a second catalytic deasphalting reactor arranged in parallel. The first catalytic deasphalting reactor and second catalytic deasphalting reactor each comprise catalyst having a solid heteropolyacid compound. The process includes introducing a feed comprising crude oil and non-paraffinic solvent to the first catalytic deasphalting reactor to deasphalt the feed, introducing non-paraffinic solvent to the second catalytic deasphalting reactor to regenerate catalyst in the second catalytic deasphalting reactor while the deasphalting step is performed in the first catalytic deasphalting reactor, introducing a non-paraffinic wash solvent to the first catalytic deasphalting reactor after deasphalting to remove the polymerized asphaltenes to regenerate the catalyst in the first catalytic deasphalting reactor and produce a mixture comprising solvent and polymerized asphaltenes, passing the mixture to a separator downstream of the catalytic deasphalting reactor system to separate the wash solvent from the polymerized asphaltenes, and reintroducing at least a portion of the separated wash solvent to at least one of the first and second catalytic deasphalting reactors of the catalytic deasphalting reactor system.

Figure 1:
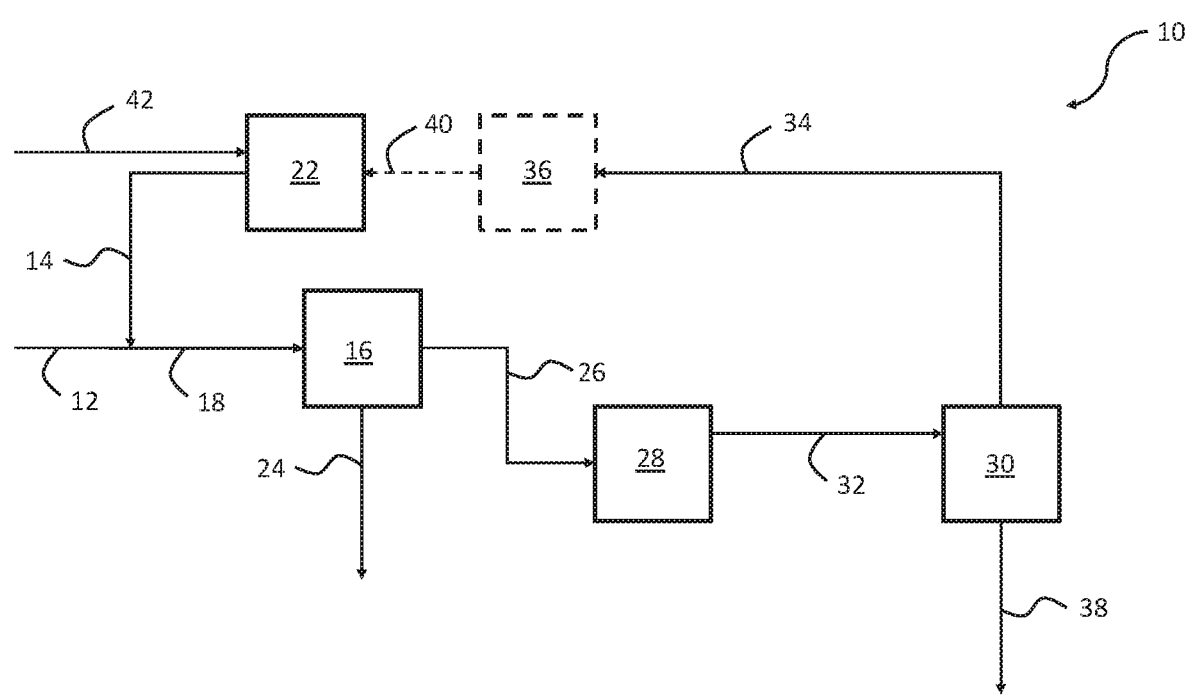
FIG. 1 is a schematic of a catalytic deasphalting system for embodiments of the catalytic deasphalting process described herein.
Figure 2:
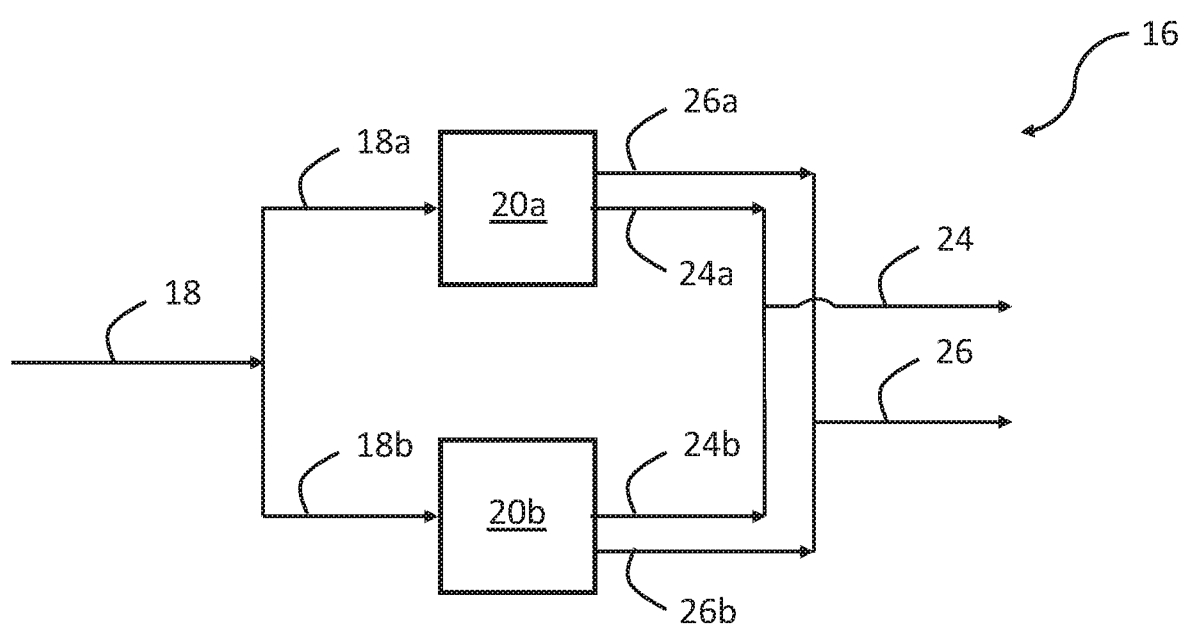
FIG. 2 is a schematic of a catalytic deasphalting reactor zone having two reactors according to embodiments described herein.

Referring now to FIG. 1, a catalytic deasphalting system 10 may be used to remove asphaltenes from crude oil. The catalytic deasphalting system 10 includes an initial crude oil feed 12, which is mixed with a solvent from conduit 14 and allowed to pass into the catalytic deasphalting reactor zone 16 through conduit 18. As used herein, the term "conduit" includes casings, liners, pipes, tubes, coiled tubing, and mechanical structures with interior voids. As shown in FIG. 2, the catalytic deasphalting reactor zone 16 may include a first catalytic deasphalting reactor 20a and a second catalytic deasphalting reactor 20b. Including at least two catalytic deasphalting reactors 20a, 20b allows for continuous operation of at least one catalytic deasphalting reactor, even when one catalytic deasphalting reactor must be shut down for catalyst regeneration, cleaning, or general maintenance.

Referring to both FIG. 1 and FIG. 2, each catalytic deasphalting reactor 20a, 20b may be in one of two modes. In the reaction mode, a mixture of the asphaltenes-containing crude oil and wash solvent from solvent tank 22 is passed over a catalyst composition contained within the reactor, resulting in DAO and wash solvent exiting the catalytic deasphalting reactor zone 16 through conduit 24 and polymerized asphaltenes adsorbed to the catalyst composition within the catalytic deasphalting reactor zone 16. In the regeneration mode, wash solvent from solvent tank 22 without the asphaltenes-containing crude oil is added to the catalytic deasphalting reactor zone 16 through conduit 18 and allowed to flow through the catalytic deasphalting reactor undergoing regeneration to produce a stream of solvent and asphaltenes, which passes through conduit 26 to holding tank 28.

The mixture of wash solvent and asphaltenes is then passed from holding tank 28 to separator 30 through conduit 32. Separator 30 is used to separate the wash solvent, which passes through conduit 34 either directly to solvent tank 22 or to optional cooler 36, from the asphaltenes, which exit the separator 30 through conduit 38. When the optional cooler 36 is used, the wash solvent is condensed by the cooler 36 and then passed to the solvent tank 22 through conduit 40. As a result, the wash solvent may be recycled throughout the process. In additional, the solvent tank 22 may also be replenished through conduit 42. Recycling the wash solvent allows for a significant reduction in the amount of solvent used for the catalytic deasphalting process, providing a decreased cost and ecological impact.

Referring again to FIG. 2, catalytic deasphalting reactor zone 16 may include a first catalytic deasphalting reactor 20a and a second catalytic deasphalting reactor 20b. Conduit 18, which provides wash solvent from solvent tank 22 or the asphaltenes-containing crude oil mixed with wash solvent, may be divided into two parallel conduits 18a and 18b. Each of the parallel conduits 18a, 18b feed an individual catalytic deasphalting reactor 20a, 20b. Similarly, conduit 24, which allows the mixture of DAO and wash solvent to exit the catalytic deasphalting reactors 20a, 20b, may be divided into two parallel conduits 24a, 24b. Conduit 26, which allows the mixture of wash solvent and asphaltenes to exit the catalytic deasphalting reactors 20a, 20b, may also be divided into two parallel conduits 26a, 26b. The conduits 24a, 24b can be combined into the single conduit 24 to provide a single stream of the mixture of DAO and wash solvent. Similarly, the conduits 26a, 26b can be combined into the single conduit 26 to provide a single stream of the mixture of wash solvent and asphaltenes.

Figure 3:
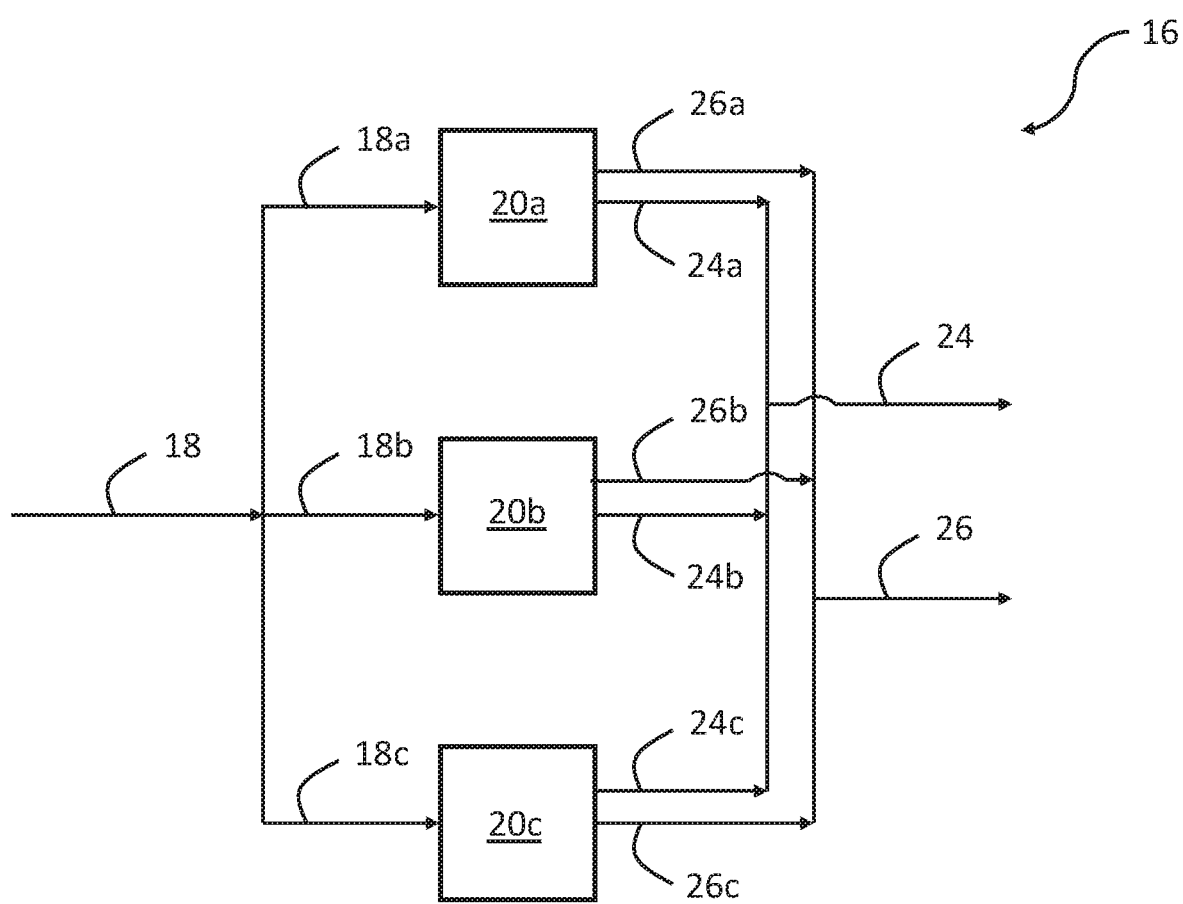
FIG. 3 is a schematic of a catalytic deasphalting reactor zone having three reactors according to embodiments described herein.

Referring now to FIG. 3, catalytic deasphalting reactor zone 16 may include a first catalytic deasphalting reactor 20a, a second catalytic deasphalting reactor 20b, and a third catalytic deasphalting reactor 20c, the operation of which is similar to that of the catalytic deasphalting reactor zone shown in FIG. 2. Conduit 18, which provides wash solvent from solvent tank 22 or the asphaltenes-containing crude oil mixed with wash solvent, may be divided into three parallel conduits 18a, 18b, 18c. Each of the parallel conduits 18a, 18b, 18c feed an individual catalytic deasphalting reactor 20a, 20b, 20c. Similarly, conduit 24, which allows the mixture of DAO and wash solvent to exit the catalytic deasphalting reactors 20a, 20b, 20c may be divided into three parallel conduits 24a, 24b, 24c. Conduit 26, which allows the mixture of wash solvent and asphaltenes to exit the catalytic deasphalting reactors 20a, 20b, 20c may be divided into three parallel conduits 26a, 26b, 26c, respectively. The conduits 24a, 24b, 24c can be combined into the single conduit 24 to provide a single stream of the mixture of DAO and wash solvent. Similarly, the conduits 26a, 26b, 26c can be combined into the single conduit 26 to provide a single stream of the mixture of wash solvent and asphaltenes.

Although embodiments having two and three catalytic deasphalting reactors 20 are shown in FIGS. 2 and 3, respectively, embodiments having additional catalytic deasphalting reactors 20 are envisioned. For instance, alternative embodiments may include four, five, six, seven, eight, nine, or even ten catalytic deasphalting reactors 20.

According to one aspect, the continuous catalytic deasphalting process includes introducing a feed comprising crude oil and non-paraffinic solvent to the first catalytic deasphalting reactor, resulting in DAO and polymerized asphaltenes. Non-paraffinic solvents include, but are not limited to, an aromatic hydrocarbon solvent, such as benzene, toluene, xylene, and mixtures thereof. While the deasphalting is performed in the first catalytic deasphalting reactor (which is thus in the reaction mode), non-paraffinic solvent may be added to a second catalytic deasphalting reactor to regenerate the catalyst of the second catalytic deasphalting reactor (which is thus in the regeneration mode). The non-paraffinic solvent used for catalyst regeneration may be, but need not be, the same non-paraffinic solvent combined with the crude oil before introducing the mixture to the first catalytic deasphalting reactor. As used herein, "non-paraffinic solvent" and "wash solvent" are synonymous. After the catalyst of the second catalytic deasphalting reactor is regenerated by washing away the polymerized asphaltenes contained therein, the second catalytic deasphalting reactor may become the reactor used for deasphalting the crude oil stream and the catalyst of the first catalytic deasphalting reactor is regenerated by washing away the polymerized asphaltenes contained therein. Stated differently, after the catalyst of the second catalytic deasphalting reactor is regenerated, the first catalytic deasphalting reactor may be switched to regeneration mode and the second catalytic deasphalting reactor may be switched to reaction mode. This cycle of reaction mode and regeneration mode may be repeated continuously as necessary for processing a given quantity of crude oil.

When more than two catalytic deasphalting reactors are used, such as when three catalytic deasphalting reactors are used, any desired number of the catalytic deasphalting reactors may be in reaction mode and any desired number of the catalytic deasphalting reactors may be in regeneration mode. For example, when three catalytic deasphalting reactors are used, the crude oil feed may be introduced to the first and third catalytic deasphalting reactors for deasphalting while the non-paraffinic solvent without the crude oil feed may be added to the second catalytic deasphalting reactor for catalyst regeneration.

Each catalytic deasphalting reactor may be charged with a catalyst composition having a solid heteropolyacid compound. In embodiments, the solid heteropolyacid compound may be selected from the group consisting of Keggin-type heteropolyacids, cesium substituted heteropolyacids, and combinations thereof. Exemplary Keggin-type heteropolyacids include, but are not limited to, phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof. Exemplary cesium substituted heteropolyacids include, but are not limited to, $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof.

In embodiments, each of the catalytic deasphalting reactors in reaction mode is heated at a temperature from 20° C. to 100° C., from 20° C. to 95° C., from 20° C. to 90° C., from 20° C. to 85° C., from 20° C. to 80° C., from 20° C. to 75° C., from 20° C. to 70° C., from 20° C. to 65° C., from 25° C. to 100° C., from 30° C. to 100° C., from 35° C. to 100° C., from 40° C. to 100° C., from 45° C. to 100° C., from 50° C. to 100° C., or even from 55° C. to 100° C. It should be understood that the temperature of the catalytic deasphalting reactor may be in a range formed from any of the lower bounds of such a temperature described herein to any of the upper bounds of such a temperature described herein.

In embodiments, the pressure within each of the catalytic deasphalting reactors may be above atmospheric in reaction mode as the reactor is heated toward the reaction temperature. For instance, the pressure may be from 0.1 MPa (1 bar) to 0.5 MPa (5 bar), from 0.1 MPa (1 bar) to 0.4 MPa (4 bar), from 0.1 MPa (1 bar) to 0.3 MPa (3 bar), from 0.1 MPa (1 bar) to 0.2 MPa (2 bar), from 0.2 MPa (2 bar) to 0.5 MPa (5 bar), from 0.3 MPa (3 bar) to 0.5 MPa (5 bar), or even from 0.4 MPa (4 bar) to 0.5 MPa (5 bar). It should be understood that the pressure within each of the catalytic deasphalting reactors in reaction mode may be in a range formed from any of the lower bounds of such a pressure described herein to any of the upper bounds of such a pressure described herein.

A mixture of wash solvent and polymerized asphaltenes is produced when the catalytic deasphalting reactor is in regeneration mode. This mixture may be passed to a separator downstream of the catalytic deasphalting reactor zone to separate the wash solvent from the polymerized asphaltenes. One non-limiting example of a separator is an evaporation system in which the wash solvent is evaporated, leaving a residue of polymerized asphaltenes. In embodiments, the evaporated wash solvent may be condensed by cooling the evaporated wash solvent. For instance, a cooler may be used to cool the evaporated wash solvent. The cooled wash solvent may then be recycled into the continuous catalytic deasphalting process. Other methods of separating the wash solvent from the polymerized asphaltenes are envisioned, and some of these other methods may not require the cooler for cooling the wash solvent.

As a result of the continuous catalytic deasphalting process, the DAO has a reduced concentration of asphaltenes, such as less than 1% by weight asphaltenes. For example, the produced DAO may have a reduced concentration of asphaltenes of from 0.01% by weight to 0.5% by weight, from 0.01% to 0.4%, from 0.01% to 0.3%, from 0.01% to 0.2%, from 0.01% to 0.1%, from 0.02% to 0.4%, 0.03% to 0.4%, from 0.04% to 0.4%, from 0.05% to 0.4%, from 0.06% to 0.4%, 0.07% to 0.4%, from 0.08% to 0.4%, or even from 0.09% to 0.4%. It should be understood that the DAO may have a reduced concentration of asphaltenes in a range formed from any lower bound for such a range described herein to any upper bound for such a range described herein, including complete removal of asphaltenes (0% by weight of the DAO) and removal of all but a trace amount of asphaltenes. The DAO exiting the catalytic deasphalting process has a lower viscosity and less toxic elements (e.g., S, N, Ni, and V) relative to the crude oil entering the catalytic deasphalting process.

As described above, embodiments of the process may include switching the operational mode (i.e., reaction mode and regeneration mode) of each of the catalytic deasphalting reactors. Various means of controlling this switching are possible. For instance, a control system may trigger the change in operational modes when a level of catalyst deactivation in one of the catalytic deasphalting reactors exceeds an acceptable level of catalyst deactivation. In some embodiments, the control system may switch operational modes of multiple catalytic deasphalting reactors simultaneously. For example, the control system may switch the first catalytic deasphalting reactor to reaction mode from regeneration mode simultaneously with switching the second catalytic deasphalting reactor to regeneration mode from reaction mode.

According to a first aspect, either alone or in combination with any other aspect, a continuous catalytic deasphalting process for producing a reduced concentration of asphaltenes in deasphalted oil includes a catalytic deasphalting reactor system, the catalytic deasphalting reactor system comprising at least a first catalytic deasphalting reactor and a second catalytic deasphalting reactor arranged in parallel, wherein the first catalytic deasphalting reactor and the second catalytic deasphalting reactor each comprise catalyst having a solid heteropolyacid compound. The process includes introducing a feed comprising crude oil and non-paraffinic solvent to the first catalytic deasphalting reactor to deasphalt the feed, wherein the deasphalting produces polymerized asphaltene adsorbed to the catalyst and deasphalted oil; introducing non-paraffinic solvent to the second catalytic deasphalting reactor to regenerate catalyst in the second catalytic deasphalting reactor while the deasphalting step is performed in the first catalytic deasphalting reactor; introducing a non-paraffinic wash solvent to the first catalytic deasphalting reactor after deasphalting to remove the polymerized asphaltene, thereby regenerating the catalyst in the first catalytic deasphalting reactor and producing a mixture comprising solvent and polymerized asphaltene; passing the mixture to a separator downstream of the catalytic deasphalting reactor system to separate the wash solvent from the polymerized asphaltenes; and reintroducing at least a portion of the separated wash solvent to at least one of the first and second catalytic deasphalting reactors of the catalytic deasphalting reactor system.

According to a second aspect, either alone or in combination with any other aspect, the non-paraffinic wash solvent comprises an aromatic hydrocarbon solvent.

According to a third aspect, either alone or in combination with any other aspect, the non-paraffinic wash solvent is selected from the group consisting of benzene, toluene, xylene, and a mixture of two or more thereof.

According to a fourth aspect, either alone or in combination with any other aspect, the separator evaporates the non-paraffinic wash solvent from the polymerized asphaltenes.

According to a fifth aspect, either alone or in combination with any other aspect, the method further comprises cooling the evaporated wash solvent and storing the cooled wash solvent in a solvent reservoir.

According to a sixth aspect, either alone or in combination with any other aspect, the method further comprises a third catalytic deasphalting reactor in parallel with the first and second catalytic deasphalting reactors.

According to a seventh aspect, either alone or in combination with any other aspect, the feed is introduced to the first and third catalytic deasphalting reactors for deasphalting simultaneously with the introducing non-paraffinic solvent to at least the second catalytic deasphalting reactor.

According to an eighth aspect, either alone or in combination with any other aspect, the solid heteropolyacid compound is selected from the group consisting of Keggin-type heteropolyacids, cesium substituted heteropolyacids, and combinations thereof.

According to a ninth aspect, either alone or in combination with any other aspect, the catalyst comprises at least one Keggin-type heteropolyacid selected from the group consisting of phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof.

According to a tenth aspect, either alone or in combination with any other aspect, the catalyst comprises at least one cesium substituted heteropolyacid selected from the group consisting of $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof.

According to a eleventh aspect, either alone or in combination with any other aspect, the reduced concentration of asphaltenes in the deasphalted oil is less than 10% by weight based on the deasphalted oil.

According to a twelfth aspect, either alone or in combination with any other aspect, the reduced concentration of asphaltenes in the deasphalted oil is from 0.01% by weight of the oil feed to 0.5% by weight based on the deasphalted oil.

According to a thirteenth aspect, either alone or in combination with any other aspect, the method further comprises switching operational modes in the catalytic deasphalting reactor system such that the first catalytic deasphalting reactor is changed to perform catalyst regeneration.

According to a fourteenth aspect, either alone or in combination with any other aspect, the method further comprises a control system which triggers the change in operational modes in the catalytic deasphalting reactor system when a level of catalyst deactivation in the first catalytic deasphalting reactor exceeds an acceptable level of catalyst deactivation.

According to a fifteenth aspect, either alone or in combination with any other aspect, the method further comprises switching operational modes in the catalytic deasphalting reactor system such that the second catalytic deasphalting reactor is changed to perform deasphalting.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A continuous catalytic deasphalting process for producing a reduced concentration of asphaltenes in deasphalted oil, wherein the process comprises a catalytic deasphalting reactor system, the catalytic deasphalting reactor system comprising at least a first catalytic deasphalting reactor and a second catalytic deasphalting reactor arranged in parallel, wherein the first catalytic deasphalting reactor and the second catalytic deasphalting reactor each comprise catalyst having a solid heteropolyacid compound, and wherein the process comprises:

introducing a feed comprising crude oil and non-paraffinic solvent to the first catalytic deasphalting reactor to deasphalt the feed, wherein the deasphalting produces polymerized asphaltene adsorbed to the catalyst and deasphalted oil;

introducing non-paraffinic solvent to the second catalytic deasphalting reactor to regenerate catalyst in the second catalytic deasphalting reactor while the deasphalting step is performed in the first catalytic deasphalting reactor;

introducing a non-paraffinic wash solvent to the first catalytic deasphalting reactor after deasphalting to remove the polymerized asphaltene, thereby regenerating the catalyst in the first catalytic deasphalting reactor and producing a mixture comprising solvent and polymerized asphaltene;

passing the mixture to a separator downstream of the catalytic deasphalting reactor system to separate the wash solvent from the polymerized asphaltenes; and reintroducing at least a portion of the separated wash solvent to at least one of the first and second catalytic deasphalting reactors of the catalytic deasphalting reactor system.

2. The process of claim 1, wherein the non-paraffinic wash solvent comprises an aromatic hydrocarbon solvent.

3. The process of claim 1, wherein the non-paraffinic wash solvent is selected from the group consisting of benzene, toluene, xylene, and a mixture of two or more thereof.

4. The process of claim 1, wherein the separator evaporates the non-paraffinic wash solvent from the polymerized asphaltenes.

5. The process of claim 4, further comprising cooling the evaporated wash solvent and storing the cooled wash solvent in a solvent reservoir.

6. The process of claim 1, further comprising a third catalytic deasphalting reactor in parallel with the first and second catalytic deasphalting reactors.

7. The process of claim 6, wherein the feed is introduced to the first and third catalytic deasphalting reactors for deasphalting simultaneously with the introducing non-paraffinic solvent to at least the second catalytic deasphalting reactor.

8. The process of claim 1, wherein the solid heteropolyacid compound is selected from the group consisting of Keggin-type heteropolyacids, cesium substituted heteropolyacids, and combinations thereof.

9. The process of claim 8, wherein the catalyst comprises at least one Keggin-type heteropolyacid selected from the group consisting of phosphotungstic heteropolyacid ($H_3PW_{12}O_{40}$), heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof.

10. The process of claim 8, wherein the catalyst comprises at least one cesium substituted heteropolyacid selected from the group consisting of $Cs_xH_yPMo_{12}O_{40}$, where $0<x<4$ and y equals 3-x; $Cs_xH_yPW_{12}O_{40}$, where $0<x<4$ and y equals 4-x; $Cs_xH_ySiMo_{12}O_{40}$, where $0<x<4$ and y equals 3-x; $Cs_xH_ySiW_{12}O_{40}$, where $0<x<4$ and y equals 4-x; and combinations thereof.

11. The process of claim 1, wherein the reduced concentration of asphaltenes in the deasphalted oil is less than 1% by weight based on the deasphalted oil.

12. The process of claim 11, wherein the reduced concentration of asphaltenes in the deasphalted oil is from 0.01% by weight of the oil feed to 0.5% by weight based on the deasphalted oil.

13. The process of claim 1, further comprising switching operational modes in the catalytic deasphalting reactor system such that the first catalytic deasphalting reactor is changed to perform catalyst regeneration.

14. The process of claim 13, further comprising a control system which triggers the change in operational modes in the catalytic deasphalting reactor system when a level of catalyst deactivation in the first catalytic deasphalting reactor exceeds an acceptable level of catalyst deactivation.

15. The process of claim 1, further comprising switching operational modes in the catalytic deasphalting reactor system such that the second catalytic deasphalting reactor is changed to perform deasphalting.

* * * * *